(12) United States Patent
Wu et al.

(10) Patent No.: US 6,956,631 B2
(45) Date of Patent: Oct. 18, 2005

(54) LIQUID CRYSTAL DISPLAY DEVICE

(75) Inventors: Pei-Hsun Wu, Tao Yuan Shien (TW); Ying-Che Huang, Tao Yuan Shien (TW); Yu-Han Pan, Tao Yuan Shien (TW)

(73) Assignee: Quanta Display Inc., Tao Yuan Shien (TW)

( * ) Notice: Subject to any disclaimer, the term of this patent is extended or adjusted under 35 U.S.C. 154(b) by 112 days.

(21) Appl. No.: 10/662,278

(22) Filed: Sep. 16, 2003

(65) Prior Publication Data
US 2005/0007521 A1 Jan. 13, 2005

(30) Foreign Application Priority Data
Jul. 11, 2003 (TW) ................................ 92119006 A

(51) Int. Cl.[7] ........................................... G02F 1/1335
(52) U.S. Cl. ........................................ 349/96; 349/137
(58) Field of Search ............................ 349/96, 112, 137

(56) References Cited

U.S. PATENT DOCUMENTS 6,559,915 B1 * 5/2003 Amimori et al. ........... 349/112

* cited by examiner

Primary Examiner—James A. Dudek
(74) Attorney, Agent, or Firm—Bacon & Thomas

(57) ABSTRACT

The present invention relates to a liquid crystal display device, which comprises a top polarizer and a lower polarizer, a liquid crystal cell, and a back light assemble, the device is characterized in that the lower polarizer is subjected to an anti-glaring treatment while the top polarizer is not.

In the liquid crystal display device (LCD) according to the present invention, since the top polarizer is not subjected to the anti-glaring treatment, the prepared device exhibits a vision property similar to that of cathode ray tube (CRT) display device without brownish nor glittering problems associated with conventional LCD in which a top polarizer is subjected to anti-glaring treatment.

5 Claims, 1 Drawing Sheet

LIQUID CRYSTAL DISPLAY DEVICE

FIELD OF THE INVENTION

The present invention relates to a liquid crystal display device, particularly to a liquid crystal display device exhibiting a vision property similar to that of cathode ray tube display device (CRT).

BACKGROUND OF THE INVENTION

A liquid crystal display device is general consisting of a top polarizer, a lower polarizer, a liquid crystal cell, and a back light assemble. To improve a vision property of a liquid crystal display device, Japanese Patent Un-examined Publication No. JP-A-7-287102 discloses a liquid crystal display device in which a hardening layer having a high reflection index is provided on the top polarizer to reduce reflectivity of the display panel. However, the hardening layer having a high reflection index results in uneven color film. Thus, US 2001/0035929A1 discloses a liquid crystal display in which an anti-reflection film having anti-glaring property is provided on a top polarizer. Such an anti-reflection film decreases the reflectance by using the principle of optical interference, to prevent the capture of an image or the decrease of contrast due to reflection of external light in an image display device. However, although anti-glaring treatment of the top polarizer has advantages of shielding off the reflection image and decreasing the reflectance, there still are disadvantages such as browning, glittering, and decreased contrast ratio, etc.

The present inventors have conducted an investigation on the current liquid crystal display device and thus completed this invention.

SUMMARY OF THE INVENTION

The present invention relates to a liquid crystal display device, which comprises a top polarizer, a lower polarizer, a liquid crystal cell, and a back light assemble, in which the lower polarizer is subjected to an anti-glaring treatment while the top polarizer is not.

The present invention also relates to the above liquid crystal display device in which the top polarizer has a hardening protective layer.

The present invention further relates to a liquid crystal display device, in which the haze value of top polarizer having been anti-glaring treated is in the range of from 5 to 50%.

DETAILED DESCRIPTION OF THE INVENTION

Figure 1:
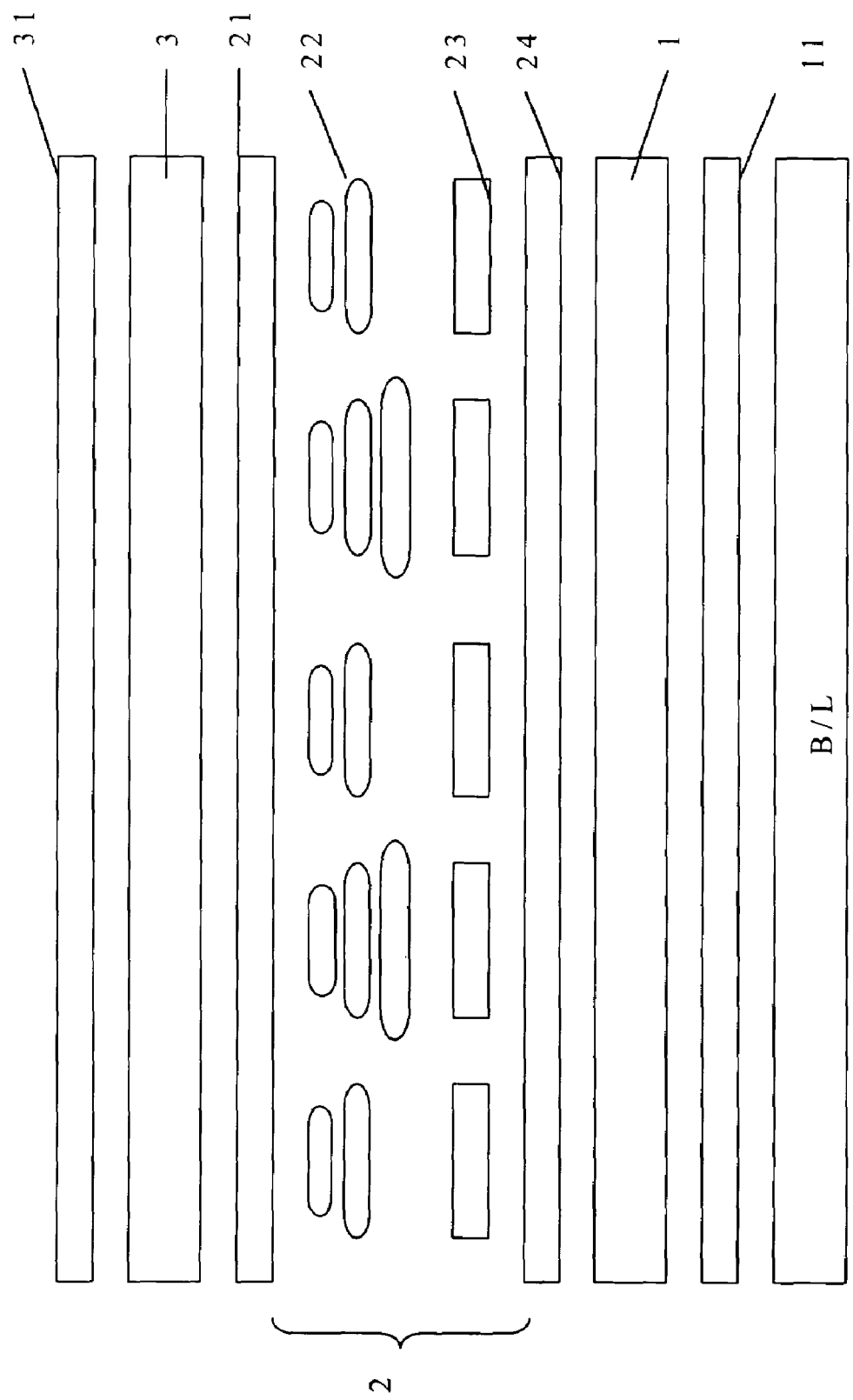
FIG. 1 is a schematic view showing a configuration of one embodiment of the present invention.

The present invention will be illustrated in great detail with reference to the accompanied drawing. In FIG. 1, it shows a configuration of the liquid crystal display device according to the present invention. The liquid crystal display device according to the present invention includes a back light assemble B/L; a lower polarizer 1 beneath which an anti-glaring layer 11 is provided; a liquid crystal element 2 provided above the lower polarizer 1, the liquid crystal element 2 is composed of a glass substrate 24 and a color filter 21, a liquid crystal compound (LC) 22 is filled into the space between the glass substrate 24 and the color filter 21, and a thin film transistor (TFT) 23; and a top polizer 3 provided above the liquid crystal element 2, on the top polizer 3 a hardening protective layer 31 is provided.

The liquid crystal display device according to the present invention exhibits a vision property similar to that of CRT due to that the top polarizer is not subjected to an anti-glaring treatment. Also, the liquid crystal display device according to the present invention overcomes the problems such as browning and glittering problems associated with current LCD. As a surface hardness of LCD is usually required to attain a value of 3H and to prevent the top polarizer from scratching during late assembling process, the top polarizer is further subjected to a hardening coating treatment to attain the required LCD hardness specification.

According to the present invention, the top polarizer is optionally subjected to an anti-reflective treatment, an anti-fouling treatment, and/or an anti-refractive treatment, etc., as long as it would not adversely affect the properties to be attained by the present invention.

In the liquid crystal display device according to the present invention, since the top polarizer is not subjected to anti-glaring treatment, an optical defect such as Newton ring will occur on the back light liquid crystal panel if the lower polarizer is not subjected to the anti-glaring treatment. To eliminate the optical defect, the lower polarizer should be subjected to the anti-glaring treatment to attain a haze value of 5 to 50%, preferably a haze of 20 to 40%. The haze value herein is defined as a ratio of diffusion transmittance to full transmittance, represented by the following equation:

Haze %=(diffusion transmittance)/(full transmittance) ×100

The haze value is measured by using a Haze Meter Model NDH-2000 manufactured by Nippon Denshoku Co., Ltd. However, the present invention is not limited to the mentioned measure method.

In the liquid crystal display device according to the present invention, the anti-glaring treatment of the top polarizer is carried out by well-known anti-glaring method such as disclosed in JP-A-7-333404 and US 2001/0035929A1. However, the anti-glaring method used in the present invention could be any anti-glaring method as long as it could achieve the desired haze value in the present invention.

In the liquid crystal display device according to the present invention, the liquid crystal element used in the present invention is a conventional one generally comprising color filter, liquid crystal, thin film transistor (TFT) devices, etc. Such devices are well known in this field. The kind of the liquid crystal used in the present invention is not critical and includes twisted nematic type (TN Type), vertical alignment type (VA Type), in plane switching type (IPS Type), and optical compensation birefraction type (OCB Type), etc.

In the liquid crystal display device according to the present invention, the top and lower polarizers could be any common used polarizer, and include, for example, thin type polarizer and general polarizer. If a wide viewing function is desired, the liquid crystal display device according to the present invention further includes wide viewing film, super wide viewing film, A-plate, C-plate, and bi-axial compensation film, and the like.

In the liquid crystal display device according to the present invention, an absorption axial angle of the top and lower polarizers varies in a range of from 0° to 180°, but the absorption axials of the top and lower polarizers are perpendicular each other.

Comparing with the conventional liquid crystal display device in which top polarizer is subjected to anti-glaring treatment and lower polarizer is not subjected to anti-glaring treatment, the liquid crystal display device according to the present invention exhibits excellent optical features, such as increased central contrast ratio, increased maximum contrast ratio, and increased right and left viewing angle. According to the liquid crystal display device of the present invention, the maximum contrast ratio value is increased from 398 (the conventional display device) to 727.8 (the present invention), the central contrast ratio value is increased from 265.2 (the conventional display device) to 311.7 (the present invention), and the left and right viewing angles are increased from 44.5/43 (left/right) to 46/45 (left/right).

From the above description, it is known that the liquid crystal display device of the present invention, which comprises a top polarizer not subjected to anti-glaring treatment, a lower polarizer subjected to anti-glaring treatment, a liquid crystal element, and a back light assemble, exhibits excellent optical features and can resolve the browning and glittering problems associated with currently liquid crystal display device. Moreover, the liquid crystal display device of the present invention exhibits a vision property similar to cathode ray tube display device (CRT) and has improved liquid crystal display quality.

The present invention has been illustrated by reference to the preferred embodiment. However, the specific embodiment is only used to illustrate the present invention without limiting the scope of the present invention. Therefore, persons skilled in the field could make any modification and change without departing from the spirit and the scope of the present invention.

What is claimed is:

1. A liquid crystal display device, which comprises a top polarizer, a lower polarizer, a liquid crystal element, and a back light assemble, said device is characterized by that the top polarizer is not subjected to an anti-glaring treatment and the lower polarizer is subjected to an anti-glaring treatment.

2. The liquid crystal display device according to claim 1, in which said top polarizer is further provided with a hardening layer.

3. The liquid crystal display device according to claim 1, in which said lower polarizer is subjected to the anti-glaring treatment to an extent that a haze value of the lower polarizer is in the range of from 5 to 50%.

4. The liquid crystal display device according to claim 3, in which said lower polarizer is subjected to the anti-glaring treatment to an extent that a haze value of the lower polarizer is in the range of from 20 to 40%.

5. The liquid crystal display device according to claim 1 which has a maximum contrast ratio value of 727.8, essential contrast ratio value of 311.7 and a left and right viewing angles of 46/45.

* * * * *

UNITED STATES PATENT AND TRADEMARK OFFICE
CERTIFICATE OF CORRECTION

| | | |
|---|---|---|
| PATENT NO. | : 6,956,631 B2 | Page 1 of 1 |
| APPLICATION NO. | : 10/662278 | |
| DATED | : October 18, 2005 | |
| INVENTOR(S) | : Wu et al. | |

It is certified that error appears in the above-identified patent and that said Letters Patent is hereby corrected as shown below:

Column 1, line 47, immediately following "... the haze value of" please delete "top" and replace it with --lower--.

Column 2, line 3, please delete "polizer" and replace it with --polarizer--.

Column 2, line 5, please delete "polizer" and replace it with --polarizer--.

Column 2, line 41, immediately following "... anti-glaring treatment of the" please delete "top" and replace it with --lower--.

Signed and Sealed this

Twenty-seventh Day of July, 2010

David J. Kappos
*Director of the United States Patent and Trademark Office*